United States Patent [19]

Kuwamoto

[11] Patent Number: 5,572,385
[45] Date of Patent: Nov. 5, 1996

[54] FLYING MAGNETIC HEAD AND FLYING MAGNETIC HEAD ASSEMBLY

[76] Inventor: Yoshinobu Kuwamoto, Sejyuru T.S 201, 15-30, Heisei 1-chome, Kumamoto-shi; Kumamoto-ken, Japan

[21] Appl. No.: 264,218

[22] Filed: Jun. 22, 1994

Related U.S. Application Data

[63] Continuation of Ser. No. 950,516, Sep. 25, 1992.

[30] Foreign Application Priority Data

Sep. 27, 1991 [JP] Japan .................................. 3-249008

[51] Int. Cl.$^6$ ....................................................... G11B 5/60
[52] U.S. Cl. ............................................................. 360/103
[58] Field of Search .................................... 360/103, 122, 360/125

[56] References Cited

U.S. PATENT DOCUMENTS

| | | | |
|---|---|---|---|
| 3,187,315 | 6/1965 | Cheney | 360/103 |
| 3,823,416 | 7/1974 | Warner | 360/103 |
| 4,945,434 | 7/1990 | Wilmer et al. | 360/103 |
| 5,173,821 | 12/1992 | Maloney | 360/122 |

FOREIGN PATENT DOCUMENTS

| | | | |
|---|---|---|---|
| 57-111827 | 7/1982 | Japan | 360/103 |
| 1-107314 | 4/1989 | Japan | 360/103 |
| 2054417 | 2/1990 | Japan | 360/103 |
| 3-209615 | 9/1991 | Japan | 360/103 |
| 4-137286 | 5/1992 | Japan | 360/103 |

*Primary Examiner*—John H. Wolff
*Assistant Examiner*—David D. Davis

[57] ABSTRACT

A flying magnetic head assembly includes a magnetic slider having a first surface working as an air bearing surface and a second surface located opposite to the first surface for mounting a load applying unit thereon. The assembly further includes a magnetic core attached to the magnetic slider with a magnetic gap therebetween and having a third surface at a side of the second surface. The third surface is formed with a fourth surface which is located at a given distance from the magnetic gap and is so arranged as to provide a clearance between the fourth surface and a corresponding portion of the load applying unit facing the fourth surface. The clearance works to absorb a deformation of the load applying unit when it occurs particularly due to a contraction of an adhesive disposed between the second surface of the magnetic slider and the load applying unit.

20 Claims, 8 Drawing Sheets (a)    (b)

5,572,385

FLYING MAGNETIC HEAD AND FLYING MAGNETIC HEAD ASSEMBLY

This application is continuation of application Ser. No. 07/950,516 filed Sep. 25, 1992 pending May 1996.

BACKGROUND OF THE INVENTION

1. Field of the Invention

The present invention relates to a flying magnetic head and a flying magnetic head assembly for use in such as a magnetic recording/reproducing device which is capable of writing or reading data on or from a magnetic recording medium.

2. Description of the Prior Art

Flying magnetic head assemblies have been known as disclosed in such as U.S. Pat. No. 3,823,416.

FIG. 1 shows a flying magnetic head 1 similar to that disclosed in the above-noted United States Patent. In FIG. 1, the flying magnetic head generally designated by a reference numeral 1 includes a magnetic slider 2 having an air bearing surface on the lower side thereof. A C-shaped core 5 is bonded with an adhesive 4 such as a bonding glass to a trailing surface of the magnetic slider 2 via a nonmagnetic film 3 therebetween. The nonmagnetic film 3 works as a magnetic gap of the flying magnetic head 1. The magnetic slider 2 and the magnetic core 5 are respectively formed of an oxide magnetic material such as a ferrite material. As shown in FIG. 1, an upper surface of the C-shaped core 5 is substantially coplanar with an upper surface of the magnetic slider 2 opposite to the air bearing surface thereof.

FIG. 2 shows a flying magnetic head assembly, wherein known load applying means is attached to the flying magnetic head 1 of FIG. 1. In FIG. 2, a gimbal 7 is fixed at its upper side to a free end portion of a load arm 6 and at its lower side to the upper surface of the magnetic slider 2 opposite to the air bearing surface thereof. Specifically, as shown in FIG. 3 (a) and (b), the gimbal 7 is made of a thin metal plate and includes a tongue 9 which is formed by an elongate slit 8 formed in the thin metal plate. The elongate slit 8 is formed as extending substantially in parallel with sides of the thin metal plate except for one side thereof which is located over the magnetic core 5, so as to provide the tongue 9 and outer side sections 11 and 12 surrounding the tongue 9. On an upper side of the tongue 9 a projection 10 is provided. The load arm 6 is bonded to upper sides of the side sections 11 and 12, and the tongue 9 is bonded at its lower side to the upper surface of the magnetic slider 2 with an adhesive 7a such as a thermosetting epoxy resin. Accordingly, the projection 10 pushes up the load arm 6 along with the side sections 11 and 12 of the gimbal 7 above a level of the tongue 9 as schematically shown in FIG. 2. A pair of grasping claws 13 are formed as extensions of the load arm 6 for holding an insulator tube 14 which receives a conductive wire 15 therethrough. The conductive wire 15 is wound around, the C-shaped core 5 to form a coil.

As shown in FIG. 2, supported by the load arm 6 via the gimbal 7, the magnetic head 1 flies over a magnetic recording disk 16 during a relative movement between the magnetic head 1 and the magnetic recording disk 16 so as to write and read magnetic data on and from the magnetic recording disk 16.

In the prior art structure as described above, however, since the adhesive 7a disposed between the upper surface of the magnetic slider 2 and the tongue 9 of the gimbal 7 is contracted as the setting of the adhesive 7a is advanced, a bending moment M is generated to be applied to the tongue 9 of the gimbal 7 so that the tongue 9 is deformed as shown in FIG. 2. As a result, a portion of the gimbal 7 disposed on the upper surface of the magnetic core 5 but not bonded thereto with the adhesive 7a is also deformed to apply a force F to the upper surface of the magnetic core 5. This inclines the flying magnetic head 1 to displace a bottom surface of the magnetic core 5 by a distance $D_1$ (about 10 nm) as indicated by a dotted line in FIG. 2, that is, the bottom surface of the magnetic core 5 exceeds a level of the air bearing surface of the magnetic slider 2 downwardly by the distance $D_1$. Since the flying magnetic head 1 starts and stops in contact with the magnetic recording disk 16, if the start/stop in-contact operation is repeatedly performed with this inclined posture of the flying magnetic head 1, the magnetic recording disk 16 as well as the magnetic gap of the flying magnetic head 1 are seriously damaged.

In order to overcome this problem, an improved flying magnetic head assembly has been proposed as disclosed in Japanese First (unexamined) Patent Publication No. 3-209615 and as shown in FIGS. 4 and 5.

In FIG. 4, a flying magnetic head 17 includes a magnetic slider 18 and a magnetic core 19 which is bonded with a binding glass 20 to a trailing surface of the magnetic slider 18 with a magnetic gap 25 formed therebetween. An upper surface of the magnetic slider 18 opposite to an air bearing surface thereof is formed into a stepped shape having a level higher surface 18a and a level lower surface 21 which is positioned at a level lower than the level higher surface 18a by a height H. In FIG. 5, load applying means including a load arm 22 and a gimbal 23 is attached to the flying magnetic head of FIG. 4. The load applying means of FIG. 5 is substantially the same as in FIGS. 2 and 3, and the gimbal 23 is bonded to the level higher surface 18a with an adhesive 24.

In the prior art structure of FIGS. 4 and 5, however, there has been raised other serious problems. Specifically, since the cutting or grinding processing of the upper surfaces of the magnetic slider 18 and the magnetic core 19 is required across the magnetic gap 25 for forming the stepped surface having the level higher and lower surfaces 18a and 21, a stress is likely to remain at the magnetic gap 25 to deteriorate the electromagnetic transducing characteristic and further to cause parting at the magnetic gap 25 even with a very small shock. Further, a bonding area between the gimbal 23 and the upper surface of the magnetic slider 18 becomes smaller to cause insufficient bonding strength between the two members 18 and 23. Still further, a bonding area between the magnetic slider 18 and the magnetic core 19 at a portion of the magnetic gap 25 becomes smaller to cause insufficient bonding strength between the two members 18 and 19.

SUMMARY OF THE INVENTION

Therefore, it is an object of the present invention to provide an improved flying magnetic head and an improved flying magnetic head assembly that can eliminate the above-noted defects inherent in the prior art.

To accomplish the above-mentioned and other objects, according to one aspect of the present invention, a flying magnetic head comprises a magnetic slider having first and second surfaces, the first surface working as an air bearing surface and the second surface located opposite to the first surface for mounting load applying means thereon; and a magnetic core attached to the magnetic slider with a magnetic gap therebetween and having a third surface at a side of the second surface, the third surface having at least at its side opposite to a side of the magnetic gap a fourth surface which is located at a level lower than the second surface, the fourth surface located at a given distance from the magnetic gap.

According to another aspect of the present invention, a flying magnetic head assembly comprises a flying magnetic head including a magnetic slider and a magnetic core attached to the magnetic slider with a magnetic gap therebetween, the magnetic slider having a first surface working as an air bearing surface and a second surface located opposite to the first surface; a gimbal attached to the second surface of the magnetic slider; and a load arm attached to said gimbal, the magnetic core having a third surface at a side of the second surface, the third surface having at least at its side opposite to a side of the magnetic gap a fourth surface which is located at a level lower than the second surface to provide a clearance between the fourth surface and a corresponding portion of the gimbal facing the fourth surface.

According to still another aspect of the present invention, a flying magnetic head assembly comprises a magnetic slider having first and second surfaces, the first surface working as an air bearing surface and the second surface located opposite to the first surface for mounting load applying means thereon; and a magnetic core attached to the magnetic slider with a magnetic gap therebetween and having a third surface at a side of the second, surface, the third surface having a fourth surface which is located at a given distance from the magnetic gap and extends to a side of the third surface located opposite to the magnetic gap, the fourth surface being so arranged as to provide a clearance between the fourth surface and a corresponding portion of the load applying means facing the fourth surface.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings.

DESCRIPTION OF THE PREFERRED EMBODIMENT

Figure 1:
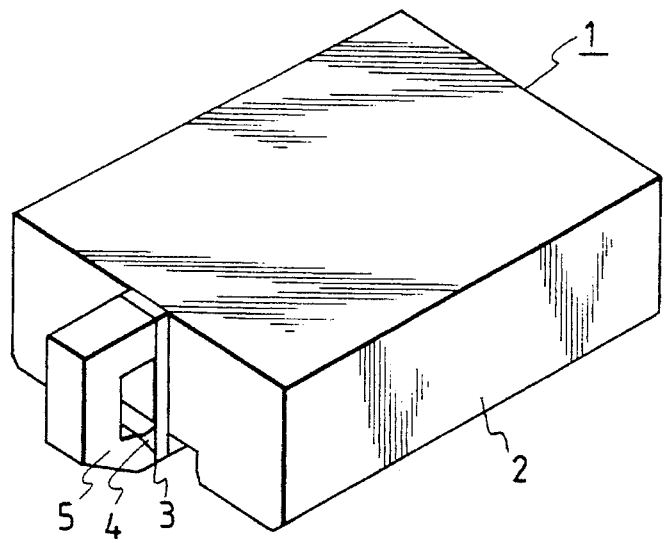
FIG. 1 is a perspective view showing a conventional flying magnetic head.

Referring now to the drawings, a first preferred embodiment of a flying magnetic head and a flying magnetic head assembly according to the present invention will be described with reference to FIGS. 6 to 10.

Figure 6:
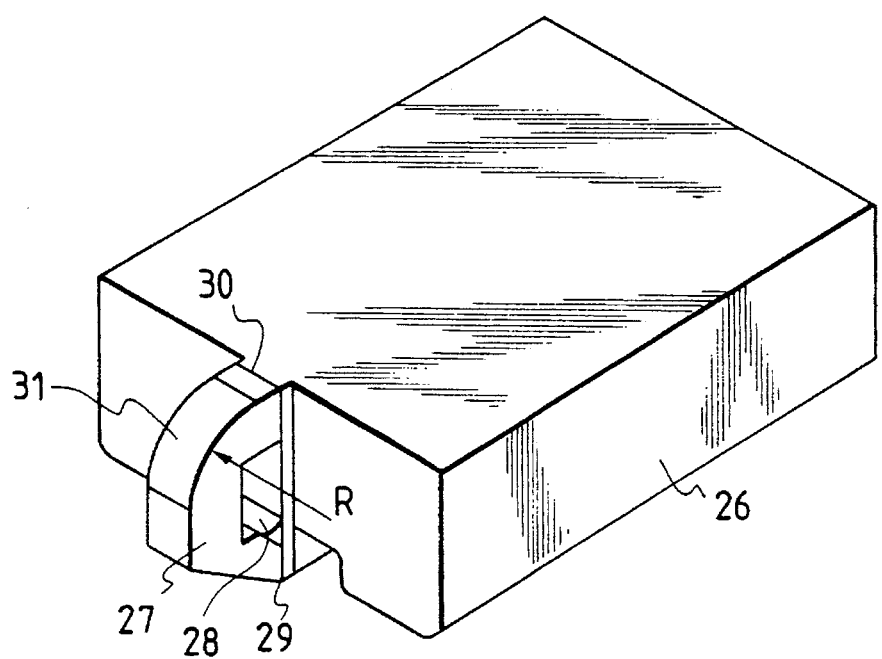
FIG. 6 is a perspective view showing a flying magnetic head according to a first preferred embodiment of the present invention.

FIG. 6 is a perspective view showing the flying magnetic head of the first preferred embodiment. In FIG. 6, a magnetic slider 26 is formed of an oxide magnetic material such as a Mn—Zn ferrite material and includes an air bearing surface at its lower side. A magnetic core 27 of a C-shape is also formed of an oxide magnetic material such as a Mn—Zn ferrite material and is bonded with an adhesive such as a bonding glass 28 to a trailing surface of the magnetic slider 26 via a nonmagnetic film (not shown). The nonmagnetic film is formed by processing a nonmagnetic material such as $SiO_2$ using the the method of sputtering and works as a magnetic gap of the flying magnetic head, i.e. a read/write front gap 29 and a back gap 30.

According to the first preferred embodiment, as shown in FIG. 6, a curved surface 31 having a predetermined radius R is formed at an upper surface of the magnetic core 27. Specifically, the curved surface 31 is provided at an upper end of the magnetic core 27 opposite to the other upper end thereof where the back gap 30 is formed. The curved surface 31 is located at a predetermined distance from the back gap 30 so as to prevent generation of a stress at the back gap 30 when the curved surface 31 is processed out.

Figure 7:
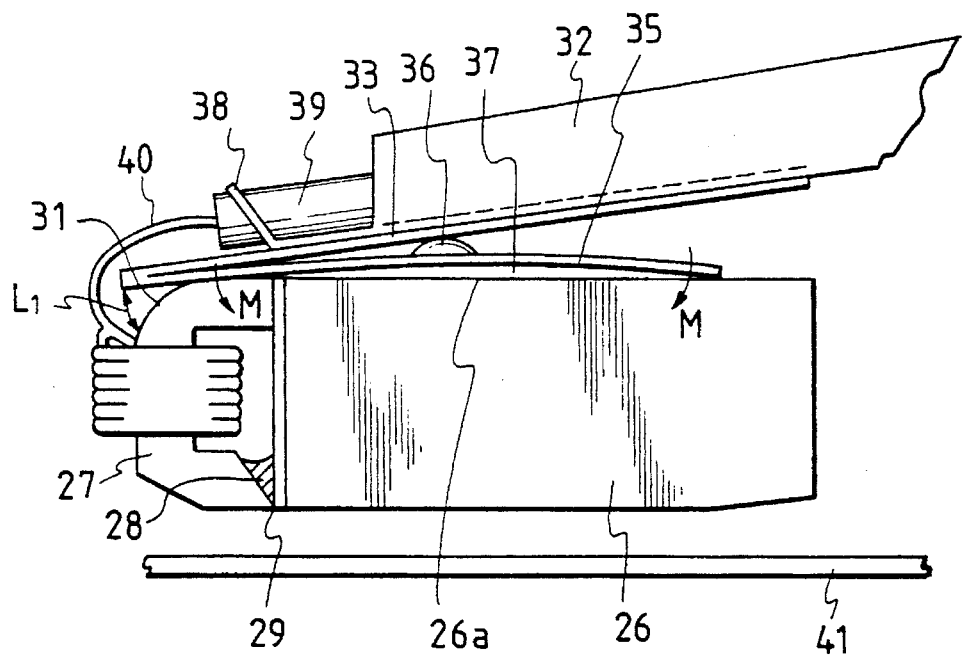
FIG. 7 is a side view showing a flying magnetic head assembly according to the first preferred embodiment of the present invention, wherein the flying magnetic head of FIG. 6 is incorporated.
Figure 8:
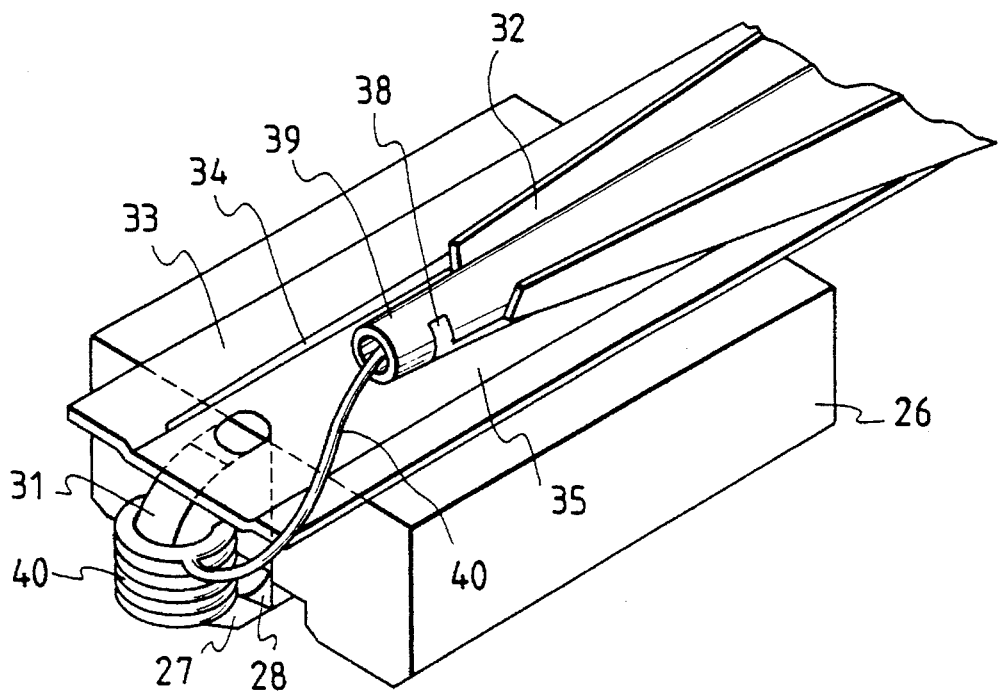
FIG. 8 is a perspective view showing the flying magnetic head assembly of FIG. 7.

FIGS. 7 and 8 respectively show the flying magnetic head assembly of the first preferred embodiment, wherein load applying means is applied to the flying magnetic head of FIG. 6. The load applying means includes a load arm and a gimbal 33 which is fixed at its upper side to a free end portion of the load arm 32 and at its lower side to an upper surface 26a of the magnetic slider 26 opposite to the air bearing surface thereof. Specifically, the gimbal 33 is made of a thin metal plate and includes a tongue 35 which is formed by an elongate slit 34 formed in the thin metal plate. The elongate slit 34 is formed as extending substantially in parallel with sides of the thin metal plate except for one side thereof which is located over the magnetic core 27, so as to provide tile tongue 35 and an outer portion surrounding the tongue 35. On an upper side of the tongue 35 a projection 36 is provided. The load arm 32 is bonded to an upper side of the outer portion of the gimbal 33, and the tongue 35 is bonded at its lower side to the upper surface of the magnetic slider 26 with an adhesive 37 such as a thermosetting epoxy resin. Accordingly, the projection 36 pushes up the load arm 32 along with the outer portion of the gimbal 33 above a level of the tongue 35 as schematically shown in FIG. 7. A pair of grasping claws 38 are formed as extensions of the load arm 32 for holding an insulator tube 39 which receives a conductive wire 40 therethrough. The conductive wire 40 is made of a conductive material such as copper and is wound around the C-shaped magnetic core 27 to form a coil. The load arm 32 and the gimbal 33 both are made of a stainless steel such as a SUS 304 material. As shown in FIG. 7, supported by the load arm 32 via the gimbal 33, the magnetic head flies over a magnetic recording disk 41 during a relative movement between the magnetic head and the magnetic recording disk 41 so as to write and read magnetic data on and from the magnetic recording disk 41.

Figure 2:
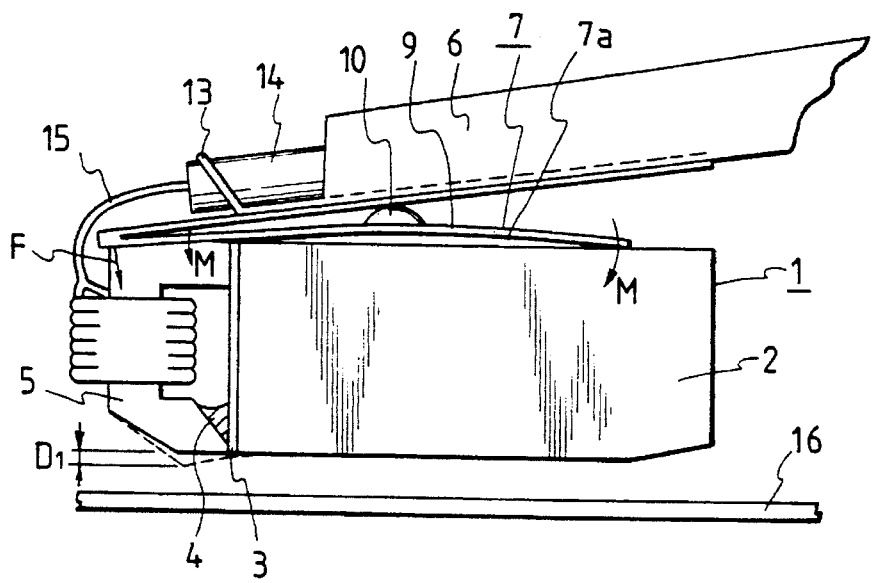
FIG. 2 is a side view showing a conventional flying magnetic head assembly, wherein the flying magnetic head of FIG. 1 is incorporated.
Figure 3:
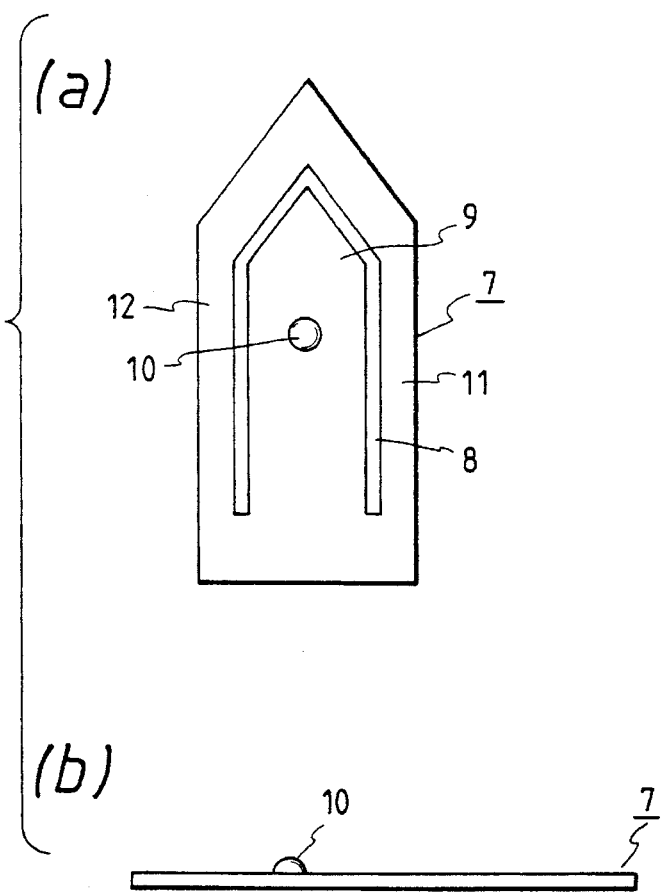
FIG. 3(a) is a plan view showing a conventional gimbal structure to be incorporated in the flying magnetic head assembly of FIG. 2.
FIG. 3(b) is a side view of the conventional gimbal structure of FIG. 3(a)
Figure 4:
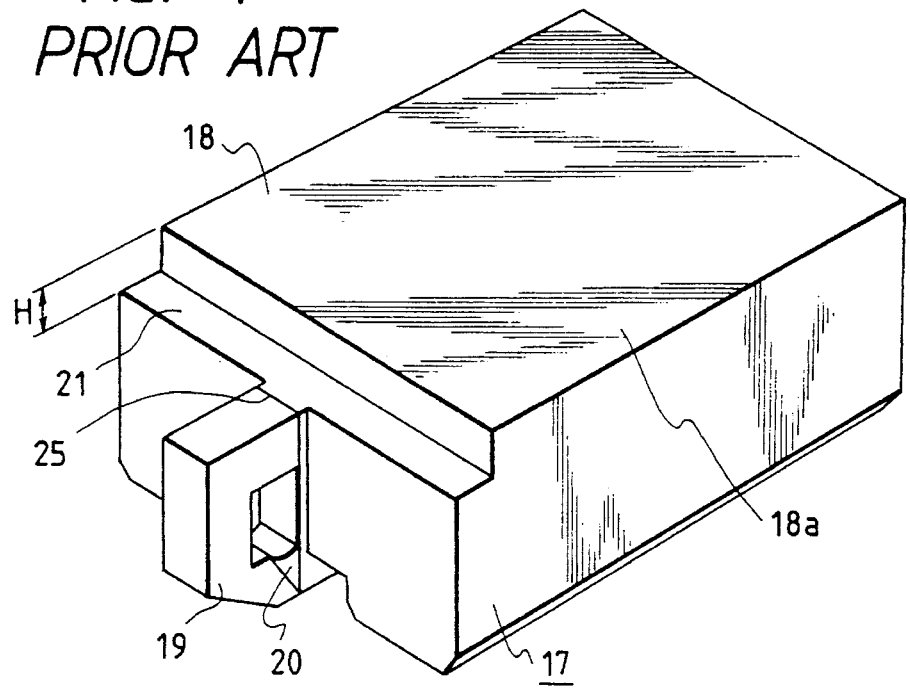
FIG. 4 is a perspective view showing another conventional flying magnetic head.

As in the foregoing prior art structure, since the adhesive 37 disposed between the upper surface of the magnetic slider 26 and the tongue 35 of the gimbal 33 is contracted as the setting of the adhesive 37 is advanced, a bending moment M is generated to be applied to the tongue 35 of the gimbal 33 so that the tongue 35 is deformed as shown in FIG. 7. As a result, a portion of the gimbal 33 disposed on the upper surface of the magnetic core 27 but not bonded thereto with the adhesive 37 is also deformed as in the foregoing prior art structure. However, in this first preferred embodiment, since the the upper surface of the magnetic core 27 is formed with the curved surface 31 which is lower in level than the upper surface 26a of the magnetic slider 26 to provide a clearance $L_1$ between the gimbal 33 and the upper surface of the magnetic core 27, the deformation of the gimbal 33 is allowed within this clearance $L_1$ so that the inclination of the flying magnetic head as shown by the dotted line in FIG. 2 is effectively prevented. As a result, the possible damages of the magnetic recording disk 41 and the front magnetic gap 29 which are otherwise caused during the start/stop in-contact operation of the flying magnetic head, can be effectively prevented.

Figure 5:
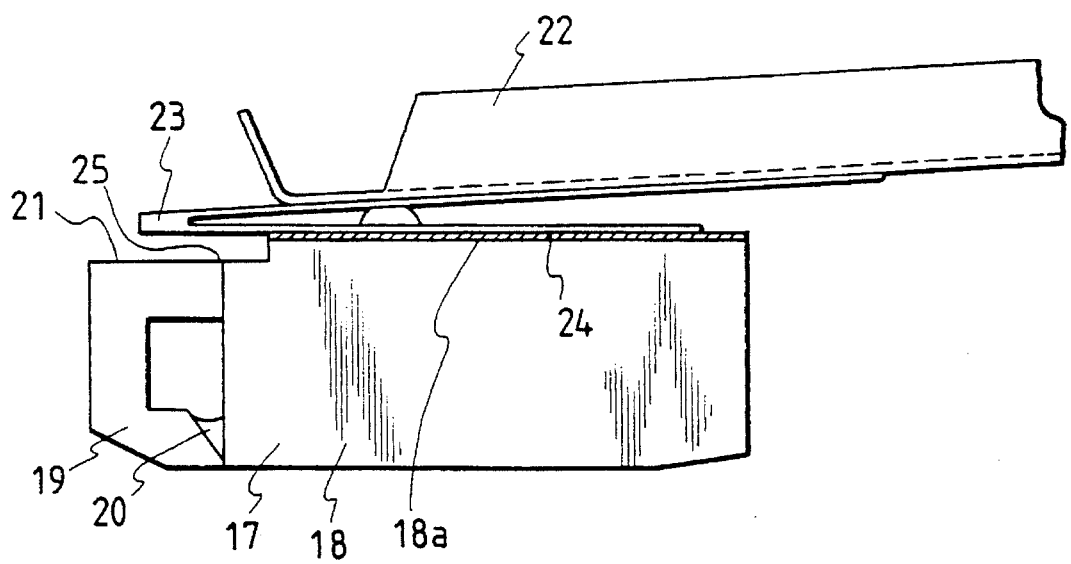
FIG. 5 is a side view showing another conventional flying magnetic head assembly, wherein the flying magnetic head of FIG. 4 is incorporated.

Since the curved surface 31 does not include the back gap 30 as opposed to the prior art of FIG. 5, the generation of a stress at the back gap 30 is also effectively prevented. Further, since an effective bonding area between the magnetic slider 26 and the gimbal 33 is not reduced as opposed to the prior art of FIG. 5, a sufficiently large bonding strength between the flying magnetic head and the gimbal 33 is ensured even if the flying magnetic head becomes smaller in size. Still further, since an effective bonding area between the magnetic slider 26 and the magnetic core 27 is not reduced as opposed to the prior art of FIG. 5, a sufficiently large bonding strength between the two members 26 and 27 is also ensured.

Figure 9:
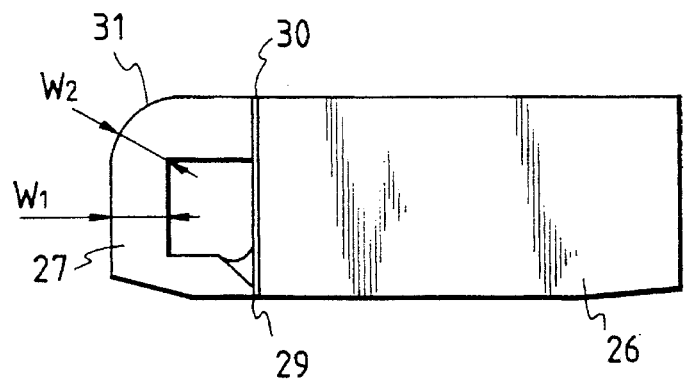
FIG. 9 is a side view showing the flying magnetic head of FIG. 6.
Figure 10:
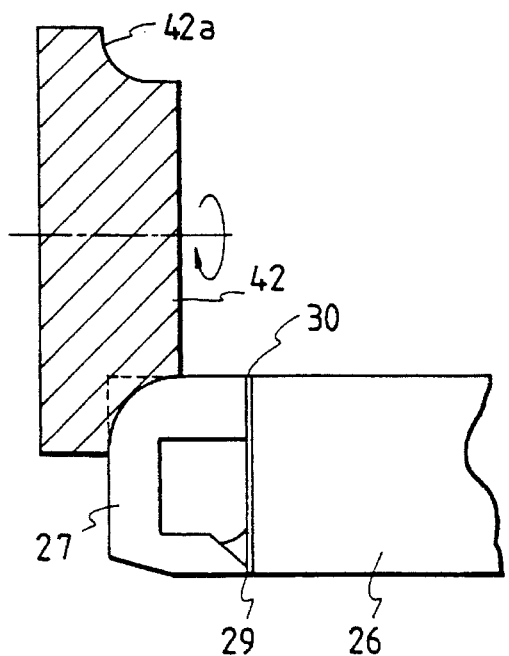
FIG. 10(a) is a side view for explaining a process of forming a curved surface of the flying magnetic head of FIG. 6.
FIG. 10(b) is a perspective view for explaining another process of forming the curved surface of the flying magnetic head of FIG. 6.
Figure 10:
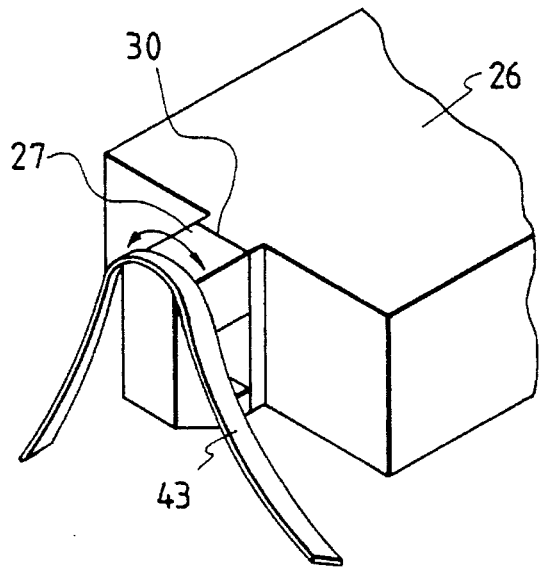

Now, the process of forming the curved surface 31 of the magnetic core 27 will be explained hereinbelow with reference to FIGS. 9 and 10.

FIG. 10(a) shows an example, wherein the curved surface 31 is formed using a rotary grindstone 42. The rotary grindstone 42 includes an annular grinding surface 42a of an arc-shape in cross-section. The curved surface 31 is formed by grinding the upper surface of the magnetic core 27 remote from the back gap 30. The shape of the grinding surface 42a is reflected on the curved surface 31. FIG. 10(b) shows another example, wherein the curved surface 31 is formed using a lapping tape 43. As shown in FIG. 9, it is preferable that a width $W_1$ of a core portion where the coil is wound around is set less than a width $W_2$ of a core portion where the curved surface 31 is formed($W_2 \geq W_1$). This width relationship is preferable since if the width $W_2$ is less than the width $W_1$, a magnetic reluctance of the magnetic core 27 becomes large so as to deteriorate the electromagnetic transducing characteristic.

Now, a second preferred embodiment of a flying magnetic head and a flying magnetic head assembly will be described with reference to FIGS. 11 to 14. In these figures, the same reference numerals designate the same or similar elements as in the first preferred embodiment so that explanation thereof may be omitted.

Figure 11:
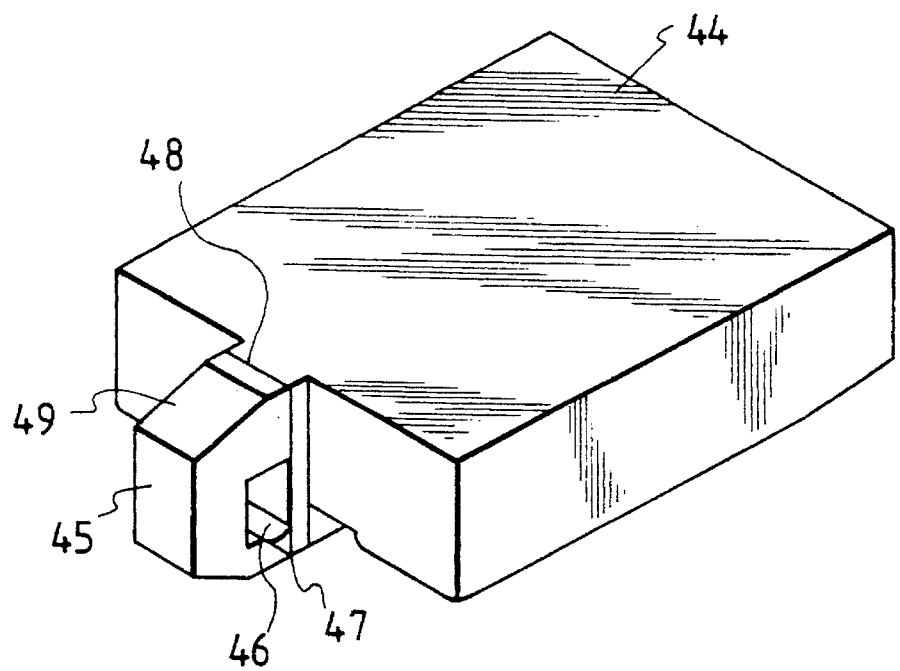
FIG. 11 is a perspective view showing a flying magnetic head according to a second preferred embodiment of the present invention.

FIG. 11 is a perspective view showing the flying magnetic head of the second preferred embodiment. In FIG. 11, a magnetic slider 44 is formed of an oxide magnetic material such as a Mn—Zn ferrite material and includes an air bearing surface at its lower side. A magnetic core 45 of a C-shape is also formed of an oxide magnetic material such as a Mn—Zn ferrite material and is bonded with an adhesive such as a bonding glass 46 to a trailing surface of the magnetic slider 44 via a nonmagnetic film (not shown). The nonmagnetic film is formed by processing a nonmagnetic material such as $SiO_2$ using the method of sputtering and works as a magnetic gap of the flying magnetic head, i.e. a read/write front gap 47 and a back gap 48.

Figure 12:
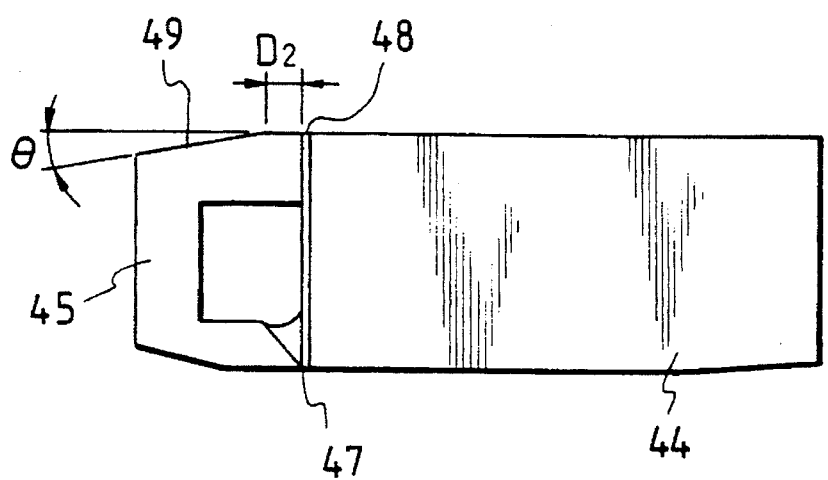
FIG. 12 is a side view showing the flying magnetic head of FIG. 11.

According to the second preferred embodiment, as shown in FIGS. 11 and 12, a slant or inclined surface 49 is formed at an upper surface of the magnetic core 45. Specifically, the slant surface 49 is provided at an upper end of the magnetic core 45 opposite to the other upper end thereof where the back gap 48 is formed. As shown in FIG. 12, an angle θ of the slant surface 49 relative to the upper surface of the magnetic slider 44 is preferably set to $0° < θ \leq 10°$, and a distance $D_2$ between the slant surface 49 and the back gap 48 is preferably set to $0.050$ mm $< D_2 \leq 0.100$ mm.

Figure 13:
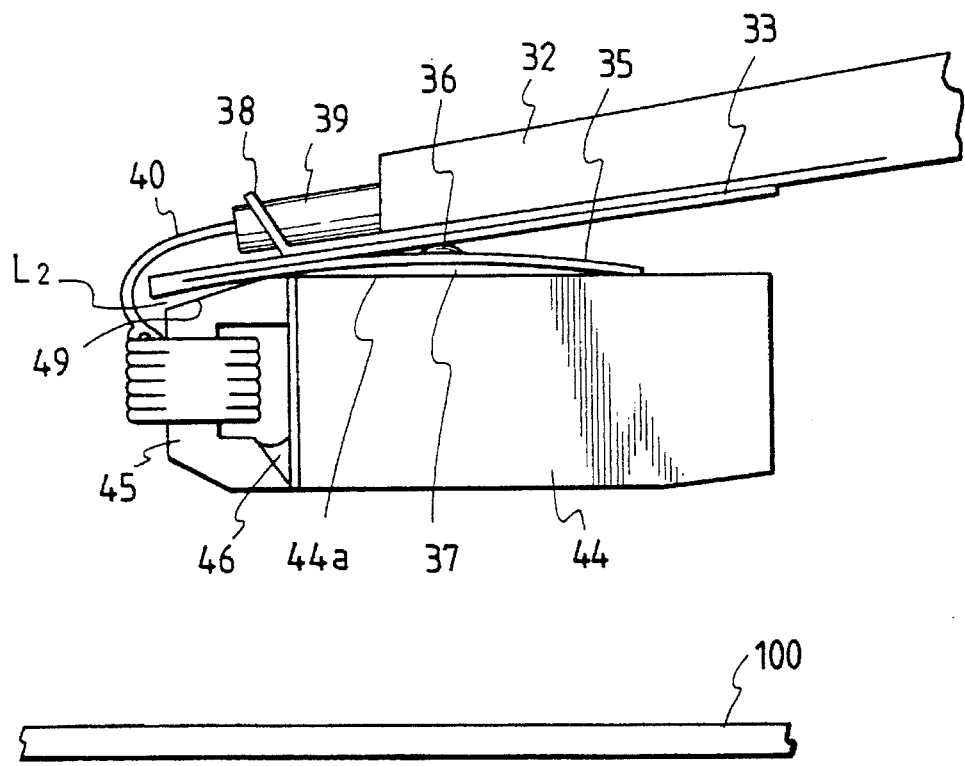
FIG. 13 is side view showing a flying magnetic head assembly according to the second preferred embodiment of the present invention, wherein the flying magnetic head of FIG. 11 is incorporated.

FIG. 13 shows the flying head assembly of the second preferred embodiment, wherein the load applying means including the load arm 32 and the gimbal 33 is applied to the flying magnetic head of FIGS. 11 and 12. As shown in FIG. 13, supported by the load arm 32 via the gimbal 33, the magnetic head flies over a magnetic recording disk 100 during a relative movement between the magnetic head and the magnetic recording disk 100 so as to write and read magnetic data on and from the magnetic recording disk 100.

As in the foregoing prior art structure, since the adhesive 37 disposed between the upper surface of the magnetic slider 44 and the tongue 35 of the gimbal 33 is contracted as the setting of the adhesive 37 is advanced, a bending moment M is generated to be applied to the tongue 35 of the gimbal 33 so that the tongue 35 is deformed as shown in FIG. 13. As a result, a portion of the gimbal 33 disposed on the upper surface of the magnetic core 45 but not bonded thereto with the adhesive 37 is also deformed as in the foregoing prior art structure. However, in this second preferred embodiment, since the upper surface of the magnetic core 45 is formed with the slant surface 49 which is lower in level than an upper surface 44a of the magnetic slider 44 to provide a clearance $L_2$ between the gimbal 33 and the upper surface of the magnetic core 45, the deformation of the gimbal 33 is allowed within this clearance $L_2$ so that the inclination of the flying magnetic head as shown by the dotted line in FIG. 2 is effectively prevented. As a result, the possible damages of the magnetic recording disk 100 and the front magnetic gap 47 which are otherwise caused during the start/stop in-contact operation of the flying magnetic head, can be effectively prevented.

Since the slant surface 49 does not include the back gap 48 as opposed to the prior art of. FIG. 5, the generation of a stress at the back gap 48 is also effectively prevented. Further, since an effective bonding area between the magnetic slider 44 and the gimbal 33 is not reduced as opposed to the prior art of FIG. 5, a sufficiently large bonding strength between the flying magnetic head and the gimbal 33 is ensured even if the flying magnetic head becomes smaller in size. Still further, since an effective bonding area between the magnetic slider 44 and the magnetic core 45 is not reduced as opposed to the prior art of FIG. 5, a sufficiently large bonding strength between the two members 44 and 45 is also ensured.

Now, the process of forming the slant surface 49 of the magnetic core 45 will be explained hereinbelow with reference to FIG. 14.

Figure 14:
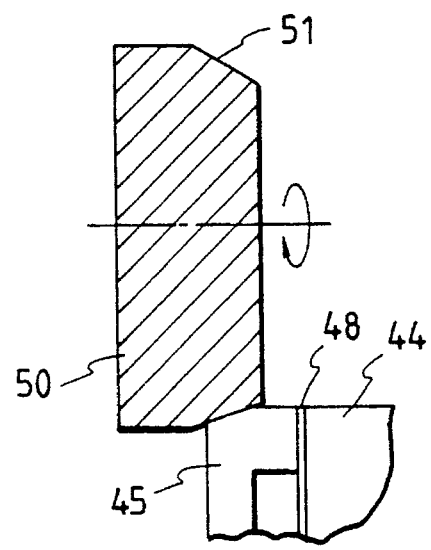
FIG. 14 is a side view for explaining a process of forming a slant surface of the flying magnetic head of FIG. 11.

FIG. 14 shows an example, wherein the slant surface 49 is formed using a rotary grindstone 50. The rotary grindstone 50 is formed with a tapering annular grinding surface 51. The slant surface 49 is formed by grinding the upper surface of the magnetic core 45 remote from the back gap 48. The shape of the grinding surface 51 is reflected on the slant surface 49.

Though the curved surface 31 or the slant surface 49 are formed in the foregoing first and second preferred embodiments to provide the clearances $L_1$ and $L_2$ for absorbing the deformation of the gimbal 33, the present invention is not limited to such shapes, i.e. any shape is applicable as long as it can provide a clearance which can absorb the deformation of the gimbal caused due to the contraction of the adhesive.

Figure 15:
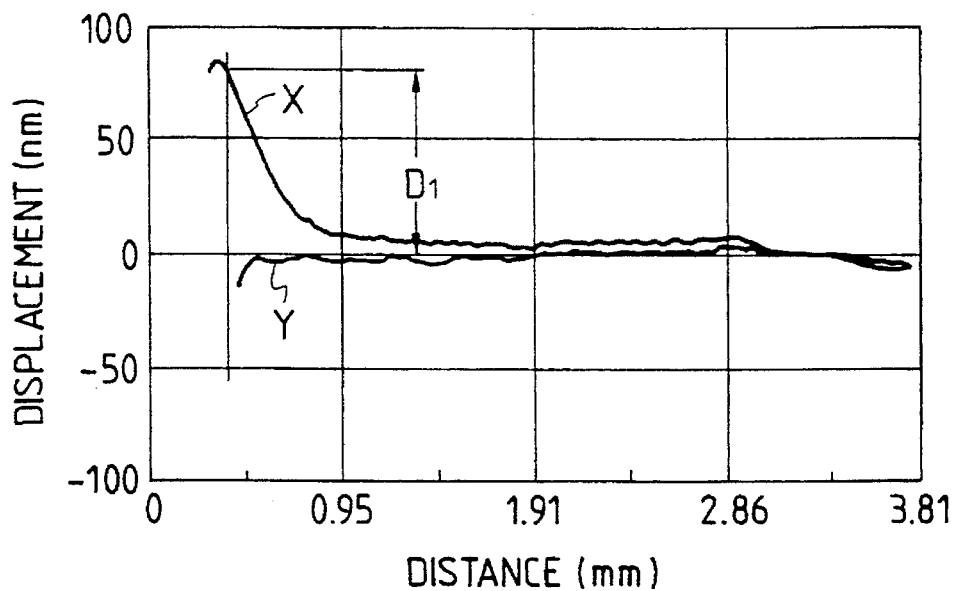
FIG. 15 is a graph showing vertical displacements of lower surfaces of the prior art flying magnetic head of FIG. 2 relative to a measured distance.

FIG. 15 shows vertical displacements of the lower surfaces of the prior art flying magnetic head of FIG. 2 relative to a measured distance, i.e. a distance of the relative movement between the flying magnetic head and the magnetic recording disk. Specifically, a line X represents a vertical displacement of the lower surface of the magnetic core 5 relative to the measured distance, and a line Y represents a vertical displacement of the air bearing surface of the magnetic slider 2 relative to the measured distance. As clear from FIG. 15, the deformation of the gimbal 7 forces the magnetic core 5 toward the magnetic recording disk by the distance $D_1$.

Figure 16:
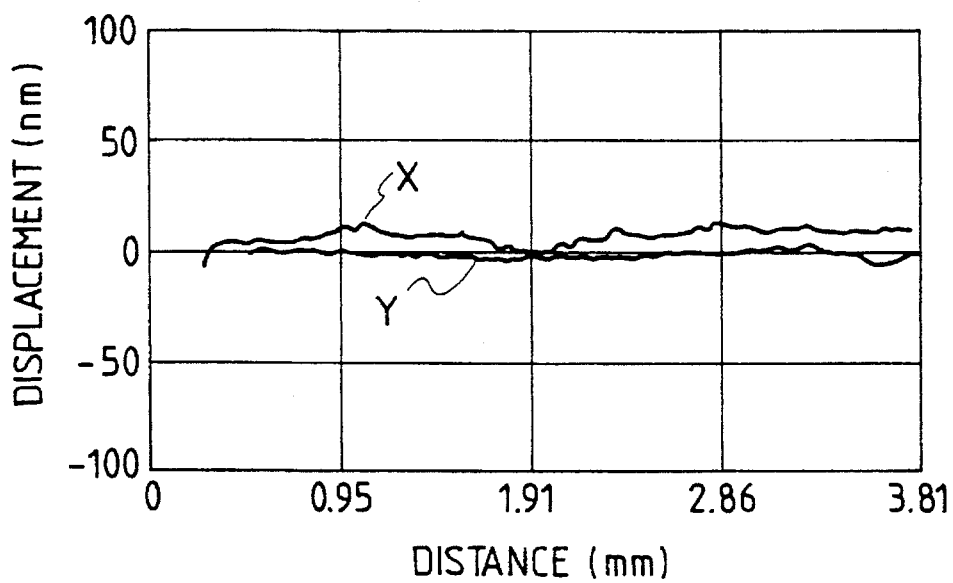
FIG. 16 is a graph showing vertical displacements of lower surfaces of the flying magnetic head of the first preferred embodiment relative to a measured distance.

FIG. 16 shows vertical displacements of the lower surfaces of the flying magnetic head of the first preferred embodiment relative to a measured distance, i.e. a distance of the relative movement between the flying magnetic head and the magnetic recording disk. Specifically, a line X represents a vertical displacement of the lower surface of the magnetic core 27 relative to the measured distance, and a line Y represents a vertical displacement of the air bearing surface of the magnetic slider 26 relative to the measured distance. As clear from FIG. 16, the deformation of the gimbal 7 is absorbed by the clearance $L_1$ so that the displacement of the magnetic core 27 due to the deformation of the gimbal 7 is effectively prevented.

Similar effects can be attained by the flying magnetic head of the second preferred embodiment.

It is to be understood that this invention is not to be limited to the preferred embodiments and modifications described above, and that various changes and modifications may be made without departing from the spirit and scope of the invention as defined in the appended claims.

What is claimed is:

1. A flying magnetic head comprising:

a magnetic slider having first and second surfaces, said first surface working as an air bearing surface and said second surface located opposite to said first surface for mounting load applying means thereon; and a magnetic core attached to said magnetic slider with a magnetic gap including a back gap therebetween and having a third surface at a side of said magnetic core adjacent to said back gap, said third surface being coplanar with said second surface, said magnetic core further having a fourth surface at another side thereof remote from said back gap, said fourth surface adjoining said third surface, said fourth surface inclined from said third surface so as to approach a level of said first surface;

said magnetic core further having a planar fifth surface substantially perpendicular to said second and third surfaces, said fifth surface remote from and free of contact with said magnetic gap;

said fourth surface extending between said third surface and said fifth surface;

wherein a distance along said third surface between said fourth surface and said back gap is greater than 0.05 mm and no greater than 0.1 mm, and an angle between said third and fourth surfaces is greater than zero and no greater than 10 degrees.

2. The flying magnetic head as set forth in claim 1, wherein said fourth surface comprises an inclined plane approaching the level of said first surface in a linear fashion.

3. The flying magnetic head as set forth in claim 1, wherein said fourth surface comprises a curved surface approaching the level of said first surface in a curved fashion.

4. The flying magnetic head as set forth in claim 1 wherein said second surface is an uppermost surface of said slider.

5. A flying magnetic head assembly comprising:

a magnetic slider having first and second surfaces, said first surface working as an air bearing surface and said second surface located opposite to said first surface;

a magnetic core attached to said magnetic slider with a magnetic gap including a back gap therebetween, and having a third surface at a side of said magnetic core adjacent to said back gap, said third surface being coplanar with said second surface, said magnetic core further having a fourth surface at another side thereof remote from said back gap, said fourth surface adjoining said third surface, said fourth surface inclined from said third surface so as to approach a level of said first surface;

said magnetic core further having a planar fifth surface substantially perpendicular to said second and third surfaces, said fifth surface remote from and free of contact with said magnetic gap;

said fourth surface extending between said third surface and said fifth surface;

wherein a distance along said third surface between said fourth surface and said back-gap is greater than 0.05 mm and no greater than 0.1 mm, and an angle between said third and fourth surfaces is greater than zero and no greater than 10 degrees;

said flying magnetic head assembly further comprising:
a gimbal bonded to said back gap and to said second and third surfaces via an adhesive therebetween, said adhesive formed of a material which is subject to contraction when setting;
wherein a clearance is provided between said fourth surface and a corresponding portion of said gimbal facing said fourth surface for preventing said gimbal from pressing said magnetic core even when said gimbal deforms due to said contraction of the adhesive;
said flying magnetic head assembly further comprising:
a load arm to which said gimbal is mounted, said load arm holding a conductive wire wound around said magnetic core to form a coil.

6. The flying magnetic head assembly as set forth in claim 5, wherein said fourth surface comprises an inclined plane approaching the level of said first surface in a linear fashion.

7. The flying magnetic head assembly as set forth in claim 5, wherein said fourth surface comprises a curved surface approaching the level of said first surface in a curved fashion.

8. The flying magnetic head assembly as set forth in claim 5, wherein said second surface is an uppermost surface of said slider.

9. A flying magnetic head comprising:
a magnetic slider having first and second surfaces, said first surface working as an air bearing surface and said second surface located opposite to said fire surface; and
a magnetic core attached to said magnetic slider with a magnetic gap including a back gap therebetween and having a composite surface at a side of said second surface, said composite surface having third and fourth surfaces, said third and fourth surfaces adjoining each other,
said magnetic core further having a planar fifth surface substantially perpendicular to said second and third surfaces, said fifth surface remote from and free of contact with said magnetic gap,
said fourth surface extending between said third surface and said fifth surface;
said third surface being adjacent to said back gap, coplanar with said second surface and extending from said magnetic gap to said fourth surface,
said fourth surface being remote from said back gap and inclined from said third surface in a direction away from said magnetic gap and toward a level of said first surface,
said third surface having a distance of 0.05 mm to 0.1 mm as measured from said magnetic gap to said fourth surface.

10. The flying magnetic head as set forth in claim 9, wherein said fourth surface comprises an inclined plane approaching the level of said first surface in a linear fashion.

11. The flying magnetic head as set forth in claim 9, wherein said fourth surface comprises a curved surface approaching the level of said first surface in a curved fashion.

12. The flying magnetic head as set forth in claim 9, wherein said second surface is an uppermost surface of said slider.

13. A flying magnetic head assembly comprising:
a magnetic slider having first and second surfaces, said first surface working as an air bearing surface and second surface located opposite to said first surface; and
a magnetic core attached to said magnetic slider with a magnetic gap including a back gap therebetween and having a composite surface at a side of said second surface, said composite surface having third and fourth surfaces,
said third surface being adjacent to said back gap, coplanar with said second surface and extending from said magnetic gap to said fourth surface,
said magnetic core further having a planar fifth surface substantially perpendicular to said second and third surfaces, said fifth surface remote from and free of contact with said magnetic gap,
said fourth surface extending between said third surface and said fifth surface;
said fourth surface being remote from said back gap and inclined from said third surface in a direction away from said magnetic gap and toward a level of said first surface, said third surface having a distance of 0.05 mm to 0.1 mm as measured from said magnetic gap to said fourth surface;
wherein load applying means is bonded to said back gap and to said second and third surfaces;
said assembly further comprising a clearance between said fourth surface and a corresponding portion of said load applying means facing said fourth surface.

14. The flying magnetic head assembly as set forth in claim 13, wherein said fourth surface comprises an inclined plane approaching the level of said first surface in a linear fashion.

15. The flying magnetic head assembly as set forth in claim 13, wherein said fourth surface comprises a curved surface approaching the level of said first surface in a curved fashion.

16. The flying magnetic head assembly as set forth in claim 13, wherein said second surface is an uppermost surface of said slider.

17. A flying magnetic head comprising:
a magnetic slider having first and second surfaces, said first surface working as an air bearing surface and said second surface located opposite to said first surface for mounting load applying means thereon; and
a magnetic core, attached to said magnetic slider with a magnetic gap including a back gap therebetween, and having a third surface at a side of said magnetic core adjacent to said back gap, said third surface being coplanar with said second surface, said magnetic core further having a fourth surface at another side thereof remote from said back gap, said fourth surface adjoining said third surface, said fourth surface inclined from said third surface so as to approach a level of said first surface;
wherein said magnetic core comprises a planar fifth surface substantially perpendicular to said second and third surfaces, said fifth surface remote from and free of contact with said magnetic gap,
said fourth surface extending between said third surface and said fifth surface.

18. A flying magnetic head assembly comprising:
a magnetic slider having first and second surfaces, said first surface working as an air bearing surface and said second surface located opposite to said first surface;
a magnetic core attached to said magnetic slider with a magnetic gap including a back gap therebetween and having a third surface at a side of said magnetic core adjacent to said magnetic gap, said third surface being adjacent to said back gap and coplanar with said second surface, said magnetic core further having a fourth surface at another side thereof remote from said back gap, said fourth surface adjoining said third surface, said fourth surface inclined from said third surface so as to approach a level of said first surface;

wherein said magnetic core comprises a planar fifth surface substantially perpendicular to said second and third surfaces, said fifth surface remote from and free of contact with said magnetic gap, said fourth surface extending between said third surface and said fifth surface;

said flying magnetic head assembly further comprising:
a gimbal bonded to said back gap and to said second and third surfaces via an adhesive therebetween, said adhesive formed of a material which is subject to contraction when setting;
wherein a clearance is provided between said fourth surface and a corresponding portion of said gimbal facing said fourth surface for preventing said gimbal from pressing said magnetic core even when said gimbal deforms due to said contraction of the adhesive;
said flying magnetic head assembly further comprising:
a load arm to which said gimbal is mounted, said load arm holding a conductive wire wound around said magnetic core to form a coil.

19. A flying magnetic head comprising:

a magnetic slider having first and second surfaces, said first surface working as an air bearing surface and said second surface located opposite to said first surface; and a magnetic core attached to said magnetic slider with a magnetic gap including a back gap therebetween and having a composite surface at a side of said second surface, said composite surface having third and fourth surfaces, said third surface being adjacent to said back gap, coplanar with said second surface and extending from said magnetic gap to said fourth surface, said fourth surface being remote from said back gap and inclined from said third surface in a direction away from said magnetic gap and toward a level of said first surface, wherein said magnetic core comprises a planar fifth surface substantially perpendicular to said second and third surfaces, said fifth surface remote from and free of contact with said magnetic gap, said fourth surface extending between said third surface and said fifth surface.

20. A flying magnetic head assembly comprising:

a magnetic slider having first and second surfaces, said first surface working as an air bearing surface and said second surface located opposite to said first surface; and a magnetic core attached to said magnetic slider with a magnetic gap including a back gap, therebetween and having a composite surface at a side of said second surface, said composite surface having third and fourth surfaces, said third surface being adjacent to said back gap, coplanar with said second surface and extending from said magnetic gap to said fourth surface, said fourth surface being remote from said back gap and inclined from said third surface in a direction away from said magnetic gap and toward a level of said first surface, wherein said magnetic core comprises a planar fifth surface substantially perpendicular to said second and third surfaces, said fifth surface remote from and free of contact with said magnetic gap, said fourth surface extending between said third surface and said fifth surface;

wherein load applying means is bonded to said back gap and to said second and third surfaces;

said assembly further comprising a clearance between said fourth surface and a corresponding portion of said load applying means facing said fourth surface.

* * * * *

UNITED STATES PATENT AND TRADEMARK OFFICE
CERTIFICATE OF CORRECTION

PATENT NO. : 5,572,385
DATED : November 5, 1996
INVENTOR(S) : Yoshinobu KUWAMOTO It is certified that error appears in the above-identified patent and that said Letters Patent is hereby corrected as shown below:

```
On the title page, item [73] was omitted and should read
as follows:

--[73]    Assignee: Matsushita Electric
                    Industrial Co., Ltd., Osaka, Japan--
```

Signed and Sealed this

Second Day of September, 1997

Attest:

BRUCE LEHMAN

*Attesting Officer*  *Commissioner of Patents and Trademarks*